United States Patent
Liu

(10) Patent No.: US 12,480,994 B2
(45) Date of Patent: Nov. 25, 2025

(54) SYSTEM AND METHOD FOR DETECTING BROKEN-BAR FAULT IN SQUIRREL-CAGE INDUCTION MOTORS

(71) Applicant: Mitsubishi Electric Research Laboratories, Inc., Cambridge, MA (US)

(72) Inventor: Dehong Liu, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 738 days.

(21) Appl. No.: 17/693,386

(22) Filed: Mar. 13, 2022

(65) Prior Publication Data
US 2023/0288481 A1    Sep. 14, 2023

(51) Int. Cl.
*G01R 31/34* (2020.01)
*H02H 7/06* (2006.01)

(52) U.S. Cl.
CPC ......... *G01R 31/343* (2013.01); *G01R 31/346* (2013.01); *H02H 7/065* (2013.01)

(58) Field of Classification Search
CPC .... G01R 31/346; G01R 31/343; G01R 23/16; H02H 7/065; H02H 1/003; H02H 7/08; H02H 29/024; H02H 3/50; H02H 3/52; H02P 29/024
See application file for complete search history.

(56) References Cited

U.S. PATENT DOCUMENTS

| | | | | |
|---|---|---|---|---|
| 4,430,611 A | * | 2/1984 | Boland | G01R 23/16 324/76.19 |
| 2006/0097730 A1 | * | 5/2006 | Park | G01R 31/11 324/534 |
| 2010/0295491 A1 | * | 11/2010 | Schulz | G01R 31/346 180/65.285 |
| 2011/0313691 A1 | * | 12/2011 | Dobson | G01R 31/00 702/58 |
| 2020/0348363 A1 | * | 11/2020 | Kvam | G01R 31/343 |
| 2021/0132150 A1 | * | 5/2021 | Chen | G01R 31/343 |

OTHER PUBLICATIONS

Cusido, Jordi, et al. "Signal injection as a fault detection technique." Sensors 11.3 (2011): 3356-3380. (Year: 2011).*

(Continued)

*Primary Examiner* — Lisa M Caputo
*Assistant Examiner* — Carter W Ferrell
(74) *Attorney, Agent, or Firm* — Gene Vinokur

(57) ABSTRACT

A computer-implemented method is provided for detecting broken bar faults of an induction motor during operations. The method includes steps of injecting a frequency modulation continuous wave (FMCW) voltage signal to the voltage source to power the motor, acquiring, in a time domain, a signal of a stator current powering the induction motor via an interface, performing Fourier Transform (FT) on the stator current and the injected FMCW signal to get spectra of the stator current and the injected signal, computing cross correlation between the spectrum of injected signal and the spectrum of stator current, extracting a fault signature at frequency $f=\pm 2(1-s)f_0$ in the cross-correlation function, and detecting a broken-bar fault in the induction motor if the fault signature magnitude is greater than a threshold.

20 Claims, 12 Drawing Sheets

(56) References Cited

OTHER PUBLICATIONS

Kim, Sung-Kuk, and Jul-Ki Seok. "High-frequency signal injection-based rotor bar fault detection of inverter-fed induction motors with closed rotor slots." IEEE Transactions on Industry Applications 47.4 (2011): 1624-1631. (Year: 2011).*
Bellini, Alberto, Giovanni Franceschini, and Carla Tassoni. "Monitoring of induction machines by maximum covariance method for frequency tracking." IEEE Transactions on Industry Applications 42.1 (2006): 69-78. (Year: 2006).*
Boniface, Chigozie Jacob. "Application of Sweep Frequency Response Analysis and Locked-Rotor Test for Stator Winding Inter-Turn and Broken Rotor Bar Fault Detection of Squirrel-Cage Induction Motors." (2021). (Year: 2021).*
Kaikaa, Mohamed Boucherma—Mohamed Yazid, and Abdelmalek Khezzar. "Park model of squirrel cage induction machine including space harmonics effects." Journal of Electrical Engineering 57.4 (2006): 193-199. (Year: 2006).*
Wikipedia contributors. (Mar. 13, 2022). Cross-correlation. In Wikipedia, The Free Encyclopedia. Retrieved 18:13, Jan. 16, 2025, from https://web.archive.org/web/20220313213726/https://en.wikipedia.org/wiki/Cross-correlation#expand. (Year: 2022).*

* cited by examiner

Equivalent circuit

SYSTEM AND METHOD FOR DETECTING BROKEN-BAR FAULT IN SQUIRREL-CAGE INDUCTION MOTORS

FIELD OF THE INVENTION

The present invention relates, generally, to the field of monitoring electric machines, and, more particularly, to broken-bar fault detection in induction motors using injecting (FMCW) signal.

BACKGROUND OF THE INVENTION

Broken-rotor-bar (BRB) is one of the most common faults in squirrel-cage induction motors. Although the BRB fault does not lead to an instant failure to the induction motor in general, it causes serious secondary effects such as poor starting performance, excessive vibrations, and torque fluctuation, etc. In some situations, the broken piece may hit stator windings at high velocity, causing catastrophic failures on winding insulation. Therefore, it is of great importance to detect the BRB fault and have a timely repair or maintenance.

To detect the BRB fault, the motor current signature analysis (MCSA) method has been widely used for its non-invasiveness and low cost. When one or more rotor bars are broken in the squirrel-cage induction motor, the rotor will induce extra frequency components in the stator current during operation due to rotor asymmetry caused by the broken bar. Therefore, BRB fault detection can be achieved by detecting the characteristic frequency component.

However, there are three major issues interfering the detection performance. First, the magnitude of the characteristic frequency is relatively small, depending on the total number of rotor bars. Second, the characteristic frequency is very close the power supply frequency, making it difficult to discriminate the fault signature from the dominant operating frequency component. Third, the background noise interferes the detection performance. Because of these practical issues, the characteristic frequency can be submerged in the sidelobe of the power supply frequency component or noise. Therefore, it is challenging to detect broken-bar fault.

In the past decades, all kinds of MCSA methods have been developed to improve the detection performance. For example, researchers use signal processing techniques such as ESPRIT, MUSIC, and compressive sensing to achieve high-resolution frequency spectrum such that the characteristic frequency component can be well separated. These methods typically require high signal-to-noise ratios and may perform poorly in strong noise conditions. For another example, researchers make use of the transient starting process of motor to detect the broken-bar fault. In this situation, the characteristic frequency component is well separated with the fundamental frequency due to a much slower rotating speed. However, this method requires a restart of the motor, which is not good for online monitoring. And the characteristic frequency is also varying during the starting process, making it difficult to capture the fault characteristic frequency component in a short time.

Signal injection method has been widely used for fault detection. For example, Jordi Cusido et. al. proposed to inject a wide band signal to the motor and measure the system response. According to the change of impulse response, motor fault can be detected. However, this signal injection method lacks theoretical support and physical modeling. In practice it is not clear how to tell whether the change is caused by the fault or by noise.

Therefore, there exists a need for a method and a system for detecting broken-bar faults in squirrel-cage induction motors with improved detection performance.

SUMMARY OF THE INVENTION

It is an object of some embodiments of an invention to provide a system and a method suitable for performing a broken-bar fault detection of an induction motor based on analysis of the stator current powering the induction motor with varying speed and varying load operation of the induction motor. In such a manner, the broken bar fault detection can be performed continuously and concurrently with the operation of the induction motor, and without a need for restarting the induction motor.

The major difference between our method and other existing methods are as follows. First, our method is an active sensing method which actively monitors the induced stator current of the injected frequency modulation continuous wave (FMCW) signal while most existing methods are passive methods without signal injection. Second, our injected signal is a FMCW signal, while other signal injection methods mainly inject narrow pulses, not FMCW signals. Third, our method aims to extract fault signature based on physical analysis of the motor dynamics and signal processing techniques, exhibiting good performance due to boosted magnitude of fault signature in very noisy conditions, while other detection methods rely on very weak fault signatures or the stator current change which could be caused by noise or other interference.

According to some embodiments of the present invention, a motor fault signature extraction method can be provided by actively injecting a FMCW signal. This FMCW signal is with a small magnitude and of a frequency band higher than the fundamental frequency. Since the magnitude is small, it will not interfere the operation of the motor. Under broken-bar fault condition, this injected signal will induce another FMCW signal of a frequency band lower than that of the injected signal. By analyzing the cross correlation in the frequency domain between the injected signal and the induced signal using signal processing techniques, fault signature can be extracted robustly even under noisy conditions.

Some embodiments of the present invention are based on recognitions that motor broken-bar fault signature in stator current is difficult to extract because of its small magnitude and proximity to the operating frequency. The present invention can provide a broken-bar fault detection method to improve the detection performance and sensitivity by injecting frequency modulated continuous wave (FMCW) signal to the stator voltage. Under broken-bar fault condition, this injected signal will induce another FMCW signal of a frequency band, which is coherent to the injected signal in the frequency domain but with lower frequency than that of the injected signal. By analyzing the cross correlation between the injected signal and the induced signal, fault signature can be extracted robustly even under strong-noise conditions.

Some embodiments of the computer-implemented method use a dynamic model using multi-loop equivalent circuit to simulate stator current, in which a broken bar fault is modeled by an open circuit of the corresponding branch. The injected signal is simulated by adding an extra term to the stator voltage, and the stator current is simulated and monitored using the dynamic model. We then develop a signal processing technique to extract the fault signature by analyzing the stator current. Simulation results demonstrate that our approach can effectively detect broken-bar fault even under noisy conditions.

To detect the broken-rotor-bar (BRB) fault, the motor current signature analysis (MCSA) method can be used for its non-invasiveness and low cost. When one or more rotor bars were broken in the squirrel-cage induction motor, the rotor will induce frequency components $f_b=(1\pm2\kappa s)f_0$ in the stator current during operation due to the rotor asymmetry, where s is the speed slip; $f_0$ is the power supply frequency; and $\kappa$ is the harmonic frequency index. Among these induced extra components, the $(1-2s)f_0$ component is the strongest one and typically treated as the characteristic frequency of a BRB fault. Therefore, BRB fault detection is achieved by detecting the characteristic frequency component $(1-2s)f_0$.

Further, there are three major issues interfering the detection performance. First, the magnitude of the characteristic frequency is relatively small, depending on the total number of rotor bars. For example, for a 30-rotor bar squirrel-cage motor, the fault component is typical 30~40 dB lower than that of the fundamental power supply frequency. Second, the characteristic frequency is very close the power supply frequency $f_0$. Under steady operating condition the speed slip s typically ranges from 0.005 to 0.05. For $f_0$=50 Hz power supply, the difference between the characteristic frequency and the fundamental frequency $f_0$ can be as small as $0.01f_0$=0.5 Hz, making it difficult to discriminate the fault signature from the dominant operating frequency component. Third, the background noise interferes the detection performance. Because of these practical issues, the characteristic frequency can be immerged by the sidelobe of the power supply frequency component or noise. Therefore, it is challenging to detect broken-bar fault.

Some embodiments of the invention are based on recognitions that under faulty conditions the resulting stator current powering the induction motor is sparse in a frequency domain. This is because the stator current includes a fundamental frequency of a power supply generating the stator current and its harmonics and fault frequency components caused by the fault.

According to an embodiment of the present invention, a broken-bar fault detection method is provided to improve the detection performance by injecting FMCW signal to the stator voltage. Based on an equivalent circuit model, when broken-bar fault occurs in the squirrel-cage induction motor, this injected signal will induce another FMCW signal of a frequency band. Through signal cross correlation analysis, the fault signature can be well separated and effectively extracted even under strong-noise conditions. Simulation results demonstrated that our proposed method significantly improve the broken-bar fault detection performance.

Further, some embodiments of the present invention provide a computer-implemented fault signal measuring method for detecting broken bar faults during operations of an induction motor powered by a stator voltage. In this case, the method uses a processor coupled with a memory storing instructions implementing the method, wherein the instructions, when executed by the processor, carry out at steps of the method, including: injecting FMCW signals to the induction motor being operated via an interface, wherein the FMCW signals are modulated such that the FMCW signals are superimposed on a fundamental frequency of the stator voltage; acquiring, via the interface, a response current signal generated from the induction motor in response to the injected FMCW signals for a frequency sweep period; performing spectrum analysis of the injected FMCW signals and the response current of the induction motor; computing cross correlation between a stator current frequency spectrum of the induction motor and a frequency spectrum of the injected FMCW voltage signals; extracting fault signature of broken bar fault from a result of the computed cross correlation; and determining that a broken bar fault takes place in the induction motor if a magnitude of the fault signature is greater than a threshold.

Further, according to some embodiments of the present invention, a fault-detection apparatus is provided for detecting broken bar faults during operations of an induction motor powered by a stator voltage. The fault-detection apparatus may include an interface connected to a frequency modulated continuous wave (FMCW) generator and configured to cause a controller of the induction motor to add FMCW signals to the stator voltage via the FMCW generator; a memory configured to store instructions of a computer-implemented fault signal measuring method for detecting broken bar faults during operations of an induction motor powered by a stator voltage; and a processor coupled with the memory, wherein the processor is configured to execute the instructions implementing the method, wherein the instructions, when executed by the processor, carry out at steps of the method include: injecting, via the interface, the FMCW signals to the stator voltage of the induction motor, wherein the FMCW signals are modulated such that the FMCW signals are superimposed on a fundamental frequency of the stator voltage; acquiring, via the interface connected to sensors arranged in the induction motor, a response current signal generated from the induction motor in response to the injected FMCW signals for a frequency sweep period; performing spectrum analysis of the injected FMCW signals and the response current of the induction motor; computing cross correlation between a stator current frequency spectrum of the induction motor and a frequency spectrum of the injected FMCW signals; extracting fault signature of broken bar fault from a result of the computed cross-correlation; and determining that a broken bar fault takes place in the induction motor if a magnitude of the fault signature is greater than a threshold.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

DETAILED DESCRIPTION OF THE PREFERRED EMBODIMENTS

Figure 1:
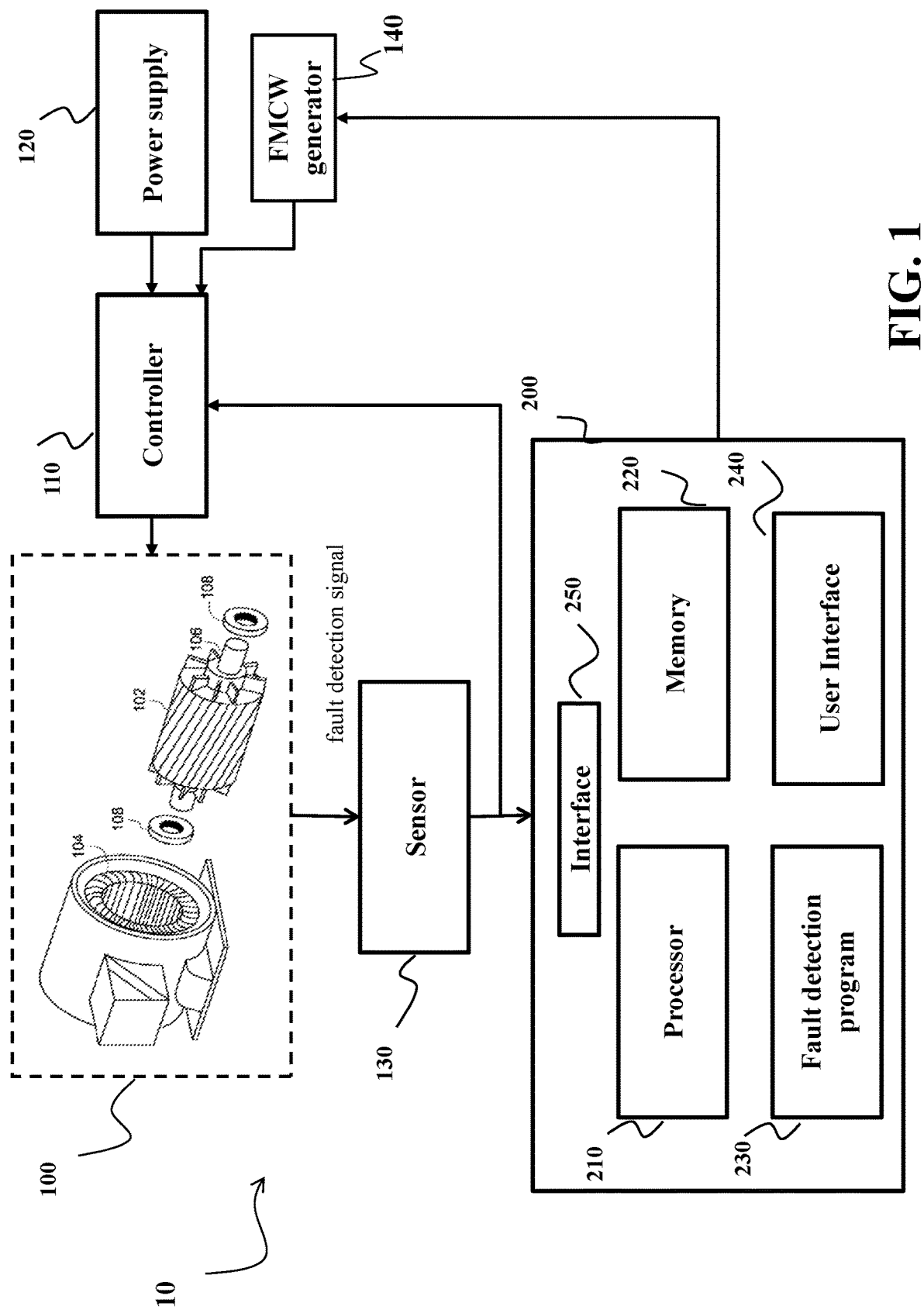
FIG. 1 is a schematic of a system for controlling an induction motor, according to embodiments of an invention.

Various embodiments of the present invention are described hereafter with reference to the figures. It would be noted that the figures are not drawn to scale elements of similar structures or functions are represented by like reference numerals throughout the figures. It should be also noted that the figures are only intended to facilitate the description of specific embodiments of the invention. They are not intended as an exhaustive description of the invention or as a limitation on the scope of the invention. In addition, an aspect described in conjunction with a particular embodiment of the invention is not necessarily limited to that embodiment and can be practiced in any other embodiments of the invention.

FIG. 1 is a schematic of a fault detection system configuration 10 illustrating an exemplar squirrel-cage induction motor according to one embodiment of an invention. The squirrel-cage induction motor 100 includes a squirrel-cage rotor assembly 102, a stator assembly 104, a main shaft 106, and a main bearing 108. In this example, the induction motor 100 is a squirrel-cage induction motor. A broken rotor bar of the assembly 102 is a typical fault for such an induction motor.

The controller 110 is powered by power supply 120 and can be used for monitoring and controlling the operation of the induction motor 100 in response to various inputs in accordance with embodiments of the present invention. For example, a controller coupled with the induction motor 100 can control the speed of the induction motor based on inputs received from sensors 130 configured to acquire data pertaining to operating conditions of the induction motor 100. According to certain embodiments, the electrical signal sensors can be current and voltage sensors for acquiring current and voltage data pertaining to the induction motor 100. For example, the current sensor senses current data from one or more of the multiple phases of the induction motor. More specifically, in the case of the induction motor is a 3-phase induction motor, the current and voltage sensors sense the current and voltage data from the three phases of the 3-phase induction motor. While certain embodiments of the present invention will be described with respect to a multi-phase induction motors, other embodiments of the present invention can be applied to other multi-phase electromechanical machines.

An FMCW generator 140 generates an FMCW voltage signal with a small magnitude (around 2% of power supply voltage). The controller 110 injects the FMCW voltage signal to the power supply signal together (FIG. 4A) to power the induction motor 100 for diagnosing the induction motor 100.

Some embodiments of the present invention describe a system for detection of broken bar faults in an electric machine, such as the induction motor 100. The system configured for detection includes a fault-detection module 200 for detecting the presence of a faulty condition of various components, including rotor bars, within the induction motor assembly. The fault-detection module 200 can be referred to as a fault-detection apparatus. In one embodiment, the fault detection module 200 is implemented as a sub-system of the controller 110. In alternative embodiment, the fault-detection module 200 is implemented using a separate processor. The fault-detection module 200 may be a hardware circuit module that is operatively connected to the controller 110. In some implementations the fault-detection module 200 and the controller 110 can share the information. For example, the fault detection module 200 can reuse sensor data used by the controller to control the operation of the induction motor.

Further, the fault-detection module 200 includes a processor 210, a memory 220, a fault detection program 230 stored in a storage to be uploaded to the memory 220 when the instructions of the program 230 are performed by the processor 210. The module 200 further includes an interface 250 configured to acquire signals from the sensors 130. The interface 250 includes A/D (analog/digital) and A/D (analog/digital) coverts to perform data communication with the processor 210 memory 220, the fault detection program 230, the user interface 240 and the sensor 130. The processor 210 may be multiple processors, and the memory 220 may be a memory module that includes multiple memories. The user interface 240 is configured to connect to a keyboard and a display unit configured indicate the normal/fault status information of the induction motor 100 in response to the output of the fault-detection module 200.

The presence of the broken bar in the induction motor 100 leads to reduction in the torque of the rotor thus leading to increasing reliance on other rotor bars of the induction motor 100 to provide the desired current. The increased dependence on other rotor bars leads to an increase in the rate of deterioration of the other rotor bars and thus leads to an overall effect on the performance of the induction motor.

In one embodiment of the invention, the current and voltage sensors respectively detect stator current and stator voltage data from the stator assembly 104 of the induction motor 100. The current data and voltage data acquired from the sensors is communicated to the controller and/or the fault detection module for further processing and analysis. The analysis includes performing motor current signature analysis (MCSA) to detect faults within the induction motor 100 using a cross correlation-based method. In some embodiments, upon detecting the fault by using the fault-detection module 200, the controller 110 receives a fault detection signal via the interface 250 of the fault-detection module 200 stops the operation of the induction motor by transmitting an interrupting signal of the stator voltage of the induction motor 100 to the controller 110 for further inspection or repair. In some cases, the sensors 130 may include a controller interface (not shown) that is configured to receive the fault detection signal from the interface 250 and transmit the fault state signal to the controller 110 such that the controller 110 interrupts the stator voltage of the induction motor 100 for stopping the operations of the induction motor 100. When the sensor 130 does not include the controller interface, the interface 250 may be configured to connect to the controller 110 such that the controller 110 interrupts the stator voltage of the induction motor 100 for stopping the operations of the induction motor 100 in response to the fault detection signal from the fault-detection module 200 via the interface 250.

The system also includes a memory for storing the measurements of the signal, the injected signal, and various parameters and coefficients for performing cross correlation analysis. The system can also include a user interface for signaling the fault, if a peak component at frequency around $f=-2(1-s)f_0$ in the cross correlation function is detected as the fault signature.

Broken-rotor-bar (BRB) is one of the most common faults in squirrel-cage induction motors. Although the BRB fault does not lead to an instant failure to the induction motor in general, it causes serious secondary effects such as poor starting performance, excessive vibrations, and torque fluctuation, etc. In some situations, the broken piece may hit stator windings at high velocity, causing catastrophic failures on winding insulation. Therefore, it is of great importance to detect the BRB fault and have a timely maintenance.

To detect the BRB fault, the motor current signature analysis (MCSA) method is widely used for its non-invasiveness and low cost. When one or more rotor bars were broken in the squirrel-cage induction motor, the rotor will induce frequency components $f_b=(1\pm 2\kappa s)f_0$ in the stator current during operation due to its asymmetry, where s is the speed slip; $f_0$ is the power supply frequency; and $\kappa$ is the harmonic frequency index. Among these extra components, the $(1-2s)f_0$ component is the strongest one and typically treated as the characteristic frequency of a BRB fault. Therefore, BRB fault detection using MCSA methods is achieved by detecting the characteristic frequency component $(1-2s)f_0$.

In practice, there are three major issues in detecting the characteristic frequency component. First, the magnitude of the characteristic frequency is relatively small, depending on the total number of rotor bars. For example, for a 30-rotor bar squirrel-cage motor, the fault component is typically 30~40 dB lower than that of the fundamental power supply frequency component. The more the number of rotor bars, the lower the relative magnitude of fault components. Second, the characteristic frequency is very close the power supply frequency $f_0$. Under steady operating condition the speed slip typically ranges from 0.005 to 0.05. For $f_0=50$ Hz power supply, the difference between the characteristic frequency and the fundamental frequency $f_0$ can be as small as $0.01f_0=0.5$ Hz, making it difficult to discriminate the fault signature from the dominant operating frequency component. Third, the background noise interferes the detection performance. Because of these practical issues, the characteristic frequency can be immerged by the sidelobe of the power supply frequency component or noise.

In the past decades, researchers have developed all kinds of MCSA methods to improve the detection performance. For example, research using signal processing techniques such as ESPRIT, MUSIC, and compressive sensing to achieve high resolution frequency spectrum such that the characteristic frequency component can be well separated. These methods typically require high signal-to-noise ratios and may perform poorly in strong noise conditions. For another example, researchers make use of the starting process of motor to detect the broken-bar fault. When the motor speed is increasing from zero to the steady asynchronous speed, the speed slip s is decreasing from 1 to a small number close to 0. In this situation, the characteristic frequency component is well separated with the power supply frequency component in the frequency domain. However, this method requires a restart of the motor, which is not preferred for online monitoring. The characteristic frequency also varies during the starting process, making it difficult to capture the fault characteristic frequency component in a short time.

In this disclosure, we proposed a motor fault signature extraction method by actively injecting a frequency modulation continuous wave (FMCW) signal. This FMCW Signal is with a small magnitude and of a frequency band higher than the fundamental frequency. Since the magnitude is small, it will not interfere the operation of the motor. Under broken-bar fault condition, this injected signal will induce another FMCW signal of a frequency band lower than that of the injected signal. By analyzing the cross correlation between the induced signal and the injected signal using signal processing techniques, fault signature can be extracted robustly even under noisy condition.

Figure 3A:
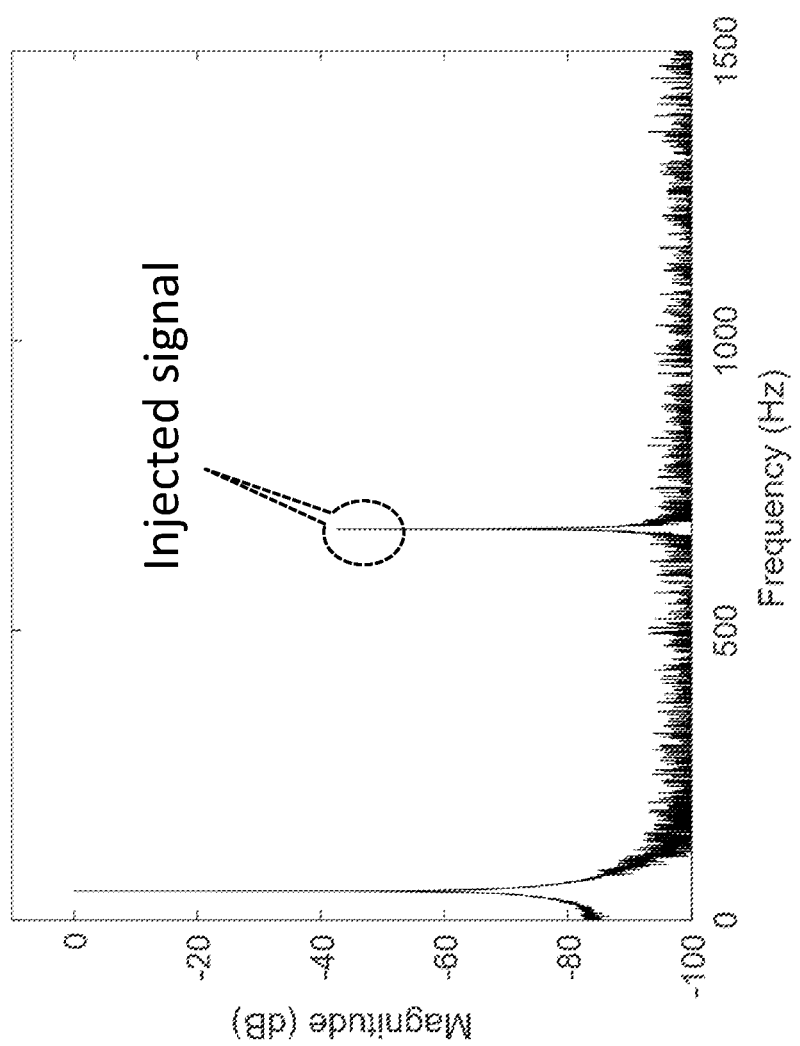
FIGS. 3A and 3B show stator current spectra with a single high frequency (HF) signal injection under healthy condition and faulty condition respectively, according to embodiments of an invention.
Figure 3B:
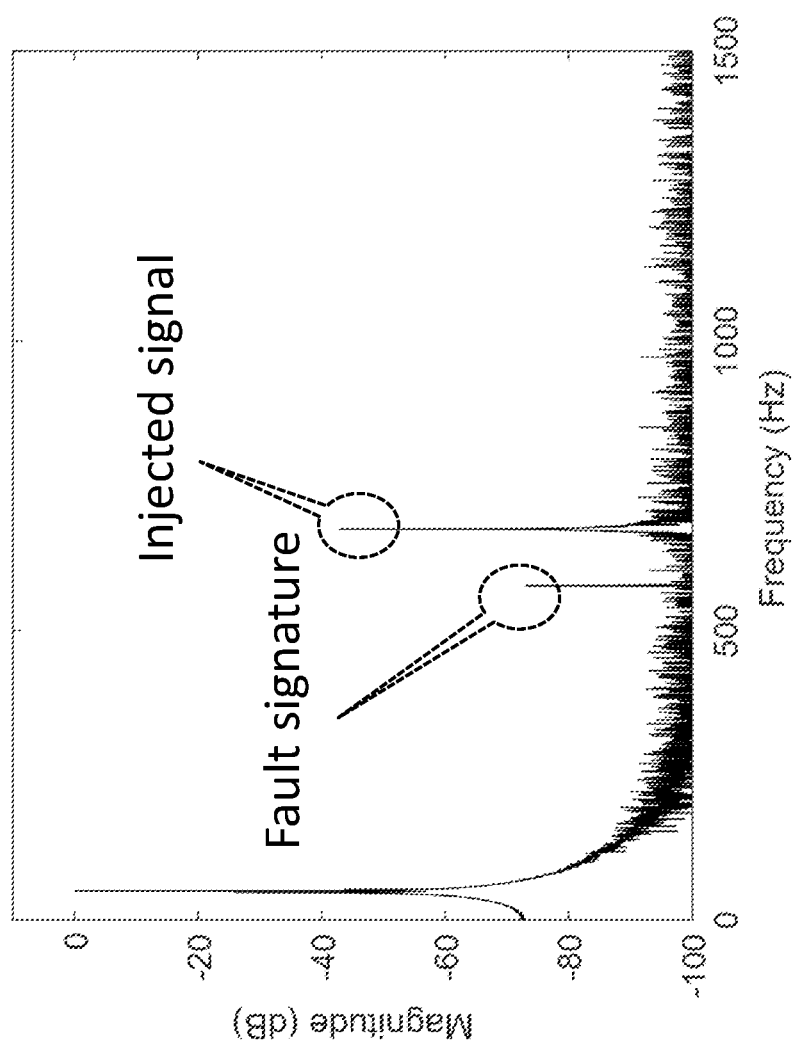

As an active sensing method, signal injection has been widely used for motor fault detection. For example, a high frequency (HF) sinusoidal signal can be injected to the stator to measure the induced harmonics to detect motor faults. For healthy motor, the current spectrum is shown in FIG. 3A and for faulty motor the current spectrum is shown in FIG. 3B. However, this high-frequency signal injection method was found to be difficult for detecting broken-bar fault because the induced signal magnitude is too small to detect. In FIG. 3B, the fault signature magnitude is about 70 dB lower than the operating signal, which makes it very difficult to detect, especially under noisy environments.

The major difference between our proposed method and other existing high frequency signal injection methods are as follows. First, our injected signal is a FMCW signal, while other signal injection methods mainly inject a single high frequency signal or a narrow time-domain pulse. Second, our fault signature extraction process is based on physical model and signal cross correlation analysis, not simply by thresholding a frequency component. Third, our fault signature frequency is located at frequency around $f=\pm 2(1-s)f_0$ in the cross correlation function, while other MSCA-based methods seek fault signature at frequency $f=(1-2s)f_0$. In addition, our method exhibits robust performance under noisy environments.

To verify our method, we build a dynamic model of squirrel cage induction motor, using multi-loop equivalent circuit to represent the coupling between stator and rotor. The stator currents under healthy and faulty conditions are simulated by changing the corresponding equivalent circuit respectively. We then develop a signal processing technique to extract fault signature. Simulation results demonstrate that our method improves the robustness of broken-bar fault detection under strong noisy conditions.

Dynamic Model of Induction Motor

In squirrel-cage induction motors, the stator consists of three sinusoidally distributed windings, displaced by 120° spatial angle. The rotor contains longitudinal conductive bars connected at both ends by shorting rings, forming a squirrel-cage like shape. As the induction motor is operating, the stator windings set up a rotating magnetic field through the rotor, inducing electrical current in the rotor bars, producing force acting at a tangent orthogonal to the rotor, and resulting in torque to turn the shaft.

In the following part of this section, we first develop a dynamic model for motors in normal healthy condition, then extend it to faulty conditions. For simplicity, we neglect magnetic saturation and assume linear magnetic characteristics. We use bold capital letters for matrices, regular capital letters for constant parameters, and small letters for time-variant parameters.

Figure 2A:
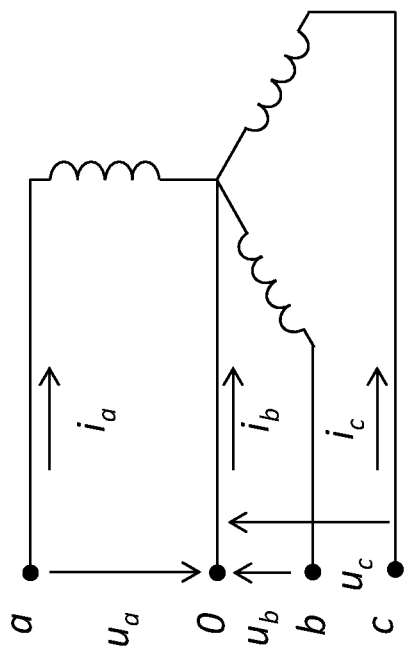
FIGS. 2A and 2B show equivalent circuits of stator windings and rotor in squirrel-cage induction motor in normal healthy condition, according to embodiments of an invention.
Figure 2C:
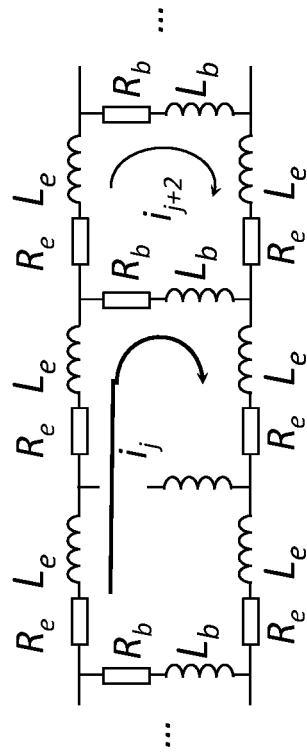
FIG. 2C shows an equivalent circuit of broken-bar fault condition, according to embodiments of an invention.
Figure 2B:
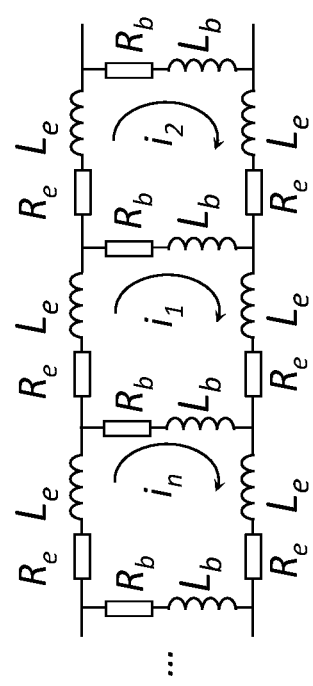

FIG. 2A shows the equivalent circuit of stator windings and FIG. 2B shows the equivalent circuit of rotor in squirrel-cage induction motor. Assuming there are n rotor bars, the squirrel-cage rotor can then be modeled as n+1 independent current loops, where n of them are identical circuit loops under ideal condition, with each loop consisting of two adjacent rotor bars connected by two end ring portions. The remaining circuit loop is formed by one of the end rings. So, the current distribution in rotor can be specified in terms of (n+1) independent loop currents, i.e., n rotor-bar loop currents $i_j$ ($1 \leq j \leq n$) plus one end ring loop current $i_e$.

Stator Voltage and Flux Equations

Based on the equivalent circuit, the voltage and flux linkage equations for the stator windings can be written as:

$$U_s = R_s I_s + \frac{d\Psi_s}{dt}, \tag{1}$$

$$\Psi_s = L_s I_s + M_{sr} I_r, \tag{2}$$

where the stator voltage $$U_s = [u_a\ u_b\ u_c]^T, \tag{3}$$

with $$u_a = U_0 \cos(2\pi f_s t + \varphi_0), \tag{4}$$

the stator current $$I_s = [i_a\ i_b\ i_c]^T, \tag{5}$$

the stator winding flux $$\Psi_s = [\psi_a\ \psi_b\ \psi_c]^T, \tag{6}$$

the stator resistance $$R_s = \begin{bmatrix} R_s & 0 & 0 \\ 0 & R_s & 0 \\ 0 & 0 & R_s \end{bmatrix}, \tag{7}$$

the stator inductance $$L_s = \begin{bmatrix} L_s & M_{ab} & M_{ac} \\ M_{ba} & L_s & M_{bc} \\ M_{ca} & M_{cb} & L_s \end{bmatrix}, \tag{8}$$

the stator-rotor mutual inductance $$M_{sr} = \begin{bmatrix} m_{a1} & m_{a2} & \cdots & m_{an} & m_{ae} \\ m_{b1} & m_{b2} & \cdots & m_{bn} & m_{be} \\ m_{c1} & m_{c2} & \cdots & m_{cn} & m_{ce} \end{bmatrix}, \tag{9}$$

and the rotor current $$I_r = [i_1\ i_2\ \ldots\ i_n\ i_e]^T. \tag{10}$$

It is important to note that the stator winding resistance in (7) and the inductance of stators in (8) are constant under our assumption, while the stator-rotor mutual inductance in (9) varies with the angular position of rotor. This is because the mutual inductance is related to the relative position between the stator windings and the rotor bars, which changes during operation.

Rotor Voltage and Flux Equations

The voltage and flux linkage equations for the rotor loops can be written as:

$$U_r = R_r I_r + \frac{d\Psi_r}{dt}, \tag{11}$$

$$\Psi_r = L_r I_r + M_{rs} I_s, \tag{12}$$

where the rotor voltage $$U_r = [u_1\ u_2\ \ldots\ u_n\ u_e]^T = [0]_{(n+1) \times 1}, \tag{13}$$

the rotor flux $$\Psi_r = [\psi_1\ \psi_2\ \ldots\ \psi_n\ \psi_e]^T, \tag{14}$$

the rotor resistance $$R_r = \begin{bmatrix} R_0 & -R_b & 0 & \cdots & 0 & -R_b & R_e \\ -R_b & R_0 & -R_b & \ddots & 0 & 0 & R_e \\ 0 & -R_b & R_0 & \ddots & 0 & 0 & R_e \\ \vdots & \ddots & \ddots & \ddots & \vdots & \vdots & \vdots \\ 0 & 0 & 0 & \cdots & R_0 & -R_b & R_e \\ -R_b & 0 & 0 & \cdots & -R_b & R_0 & R_e \\ -R_b & 0 & 0 & \cdots & -R_b & R_0 & R_e \\ R_e & R_e & R_e & \cdots & R_e & R_e & nR_e \end{bmatrix}, \tag{15}$$

with $R_0 = 2(R_b + R_e)$, the rotor inductance $$L_r = \begin{bmatrix} L_r + L_0 & M_{12} - L_b & M_{13} & \cdots & M_{1n} - L_b & L_e \\ M_{21} - L_b & L_r + L_0 & M_{23} - L_b & \ddots & M_{2n} & L_e \\ M_{31} & M_{32} - L_b & L_r + L_0 & \ddots & M_{3n} & L_e \\ \vdots & \ddots & \ddots & \ddots & \vdots & \vdots \\ M_{n1} - L_b & M_{n2} & M_{n2} & \cdots & L_r + L_0 & L_e \\ L_e & L_e & L_e & \cdots & L_e & nL_e \end{bmatrix}, \tag{16}$$

with $L_0 = 2(L_b + L_e)$, and the rotor-stator mutual inductance $M_{rs} = M_{sr}^T$.

Mechanical Equations

The mechanical equation of the induction motor can be expressed as:

$$T_e - T_l = J \frac{d\omega_r}{dt}, \tag{17}$$

where $T_e$ represents the electromagnetic torque, $T_l$ is the load, J stands for the rotor inertia, and $\omega_r$ is the angular velocity. Using the basic principle of energy conversion, the electromagnetic torque can be calculated as:

$$T_e = I_s^T \frac{dM_{sr}}{s\theta_r} I_r. \tag{18}$$

The angular velocity can be expressed in terms of change rate of rotor's angular position $\theta_r$ as follows:

$$\omega_r = \frac{d\theta_r}{dt}, \tag{19}$$

In summary, equations (1)-(19) form a dynamic model of induction motors with unknown stator and rotor currents. Given the motor parameters, we can use standard methods such as the fourth-order Runge-Kutta method for solving differential equations to simulate the stator current during dynamic operation.

Model of Faulty Condition

A computer-implemented method according to some embodiments is based on a dynamic model using multi-loop equivalent circuit to simulate stator current of the induction motor. In this case, a broken bar fault is modeled by an open circuit of the corresponding branch. The injected signal is simulated by adding an extra term to the stator voltage, and the stator current is simulated and monitored using the dynamic model.

When one bar is fully broken, the related branch becomes open circuit. Then the totally number of circuit loops is reduced by one since the related two loops are replaced by a new loop with doubled end-ring segments. The equivalent circuit of rotor under faulty condition is shown in FIG. 2C. Consequently, in (11)-(16) the corresponding loops should be removed or rebuilt with the equivalent parameters.

Comparing to other models such as the d-q model, this equivalent circuit model is straightforward to understand and flexible to simulate intermediate fault state.

Motor Parameters

Under normal healthy condition, the inductances and resistances in (7), (8), (9), (15) and (16) can be calculated. We skip the details of parameter calculations. Instead, we use public available parameters in our simulations.

FMCW Injection Based Broken-Bar Fault Detection

In this section, we focus on fault signature extraction from signal processing perspective, ignoring the detailed implementation of hardware.

FMCW Signal

In normal operating conditions, the induction motor is driven by three-phase symmetric power voltage source $$\begin{cases} u_{a0}(t) = U_0 \cos(2\pi f_0 t + \varphi_0) \\ u_{b0}(t) = U_0 \cos(2\pi f_0 t - 2\pi/3 + \varphi_0) \\ u_{c0}(t) = U_0 \cos(2\pi f_0 t + 2\pi/3 + \varphi_0) \end{cases} \quad (20)$$

We consider the following FMCW signal as injected voltage signal into the stator voltage $$\begin{cases} u_{ia}(t) = U_i \cos(\varphi_{ia}(t)) \\ u_{ib}(t) = U_i \cos(\varphi_{ia}(t) - 2\pi/3), \\ u_{ic}(t) = U_i \cos(\varphi_{ia}(t) + 2\pi/3) \end{cases} \quad (21)$$

whose frequency spectra are $$\begin{cases} U_{ia}(\omega) = \int u_{ia}(t) e^{-j\omega t} dt \\ U_{ib}(\omega) = \int u_{ib}(t) e^{-j\omega t} dt, \\ U_{ic}(\omega) = \int u_{ic}(t) e^{-j\omega t} dt \end{cases} \quad (22)$$

respectively.

Combining with the original three-phase motor source voltage, we have overall equivalent input voltage to the motor as follows $$\begin{cases} u_a(t) = U_0 \cos(2\pi f_0 t + \varphi_0) + IU_i \cos(\varphi_{ia}(t)), \\ u_b(t) = U_0 \cos(2\pi f_0 t - 2\pi/3 + \varphi_0) + U_i \cos(\varphi_{ia}(t) - 2\pi/3), \\ u_c(t) = U_0 \cos(2\pi f_0 t + 2\pi/3 + \varphi_0) + U_i \cos(\varphi_{ia}(t) + 2\pi/3), \end{cases} \quad (23)$$

where $U_i(U_i<<U_0)$ is the amplitude of the injected FMCW voltage signal and $\varphi_a(t)$ is the phase angle of the injected FMCW signal in phase A. We observe that the three phase voltage source is balanced at any time with 120° phase difference.

The amplitude $U_i$ is chosen to compromise two aspects. On one hand, it should be small enough such that the injected signal won't interfere the motor operation. On the other hand, the signal should be large enough such that the induced signal can be detected.

Figure 4A:
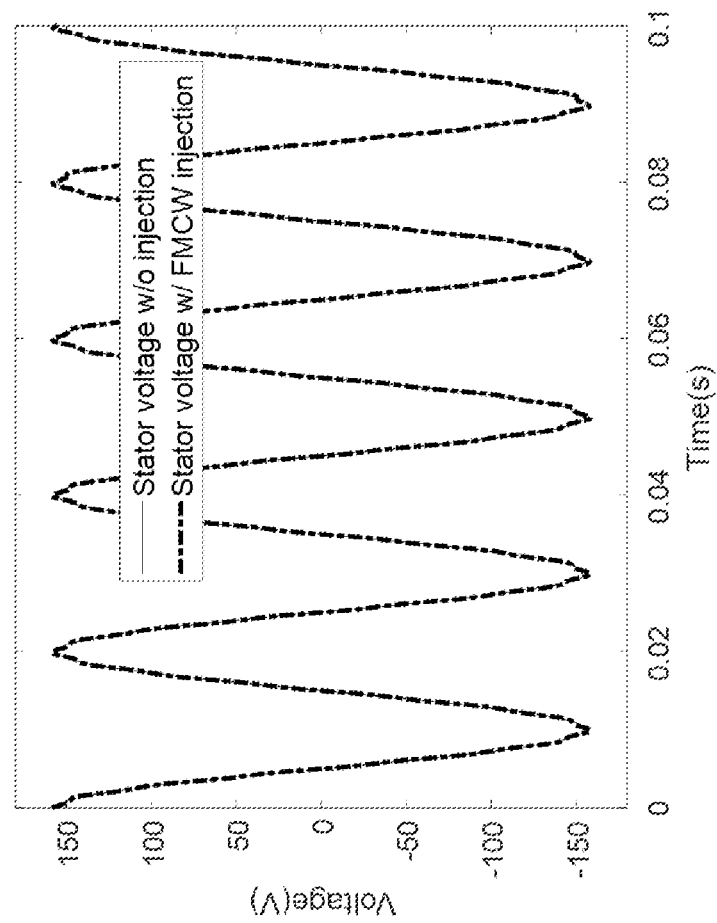
FIGS. 4A and 4B are exemplar plots of stator voltages with and without FMCW signal injection powering the induction motor in a time and a zoomed-in view of the voltages, according to embodiments of an invention.
Figure 4B:
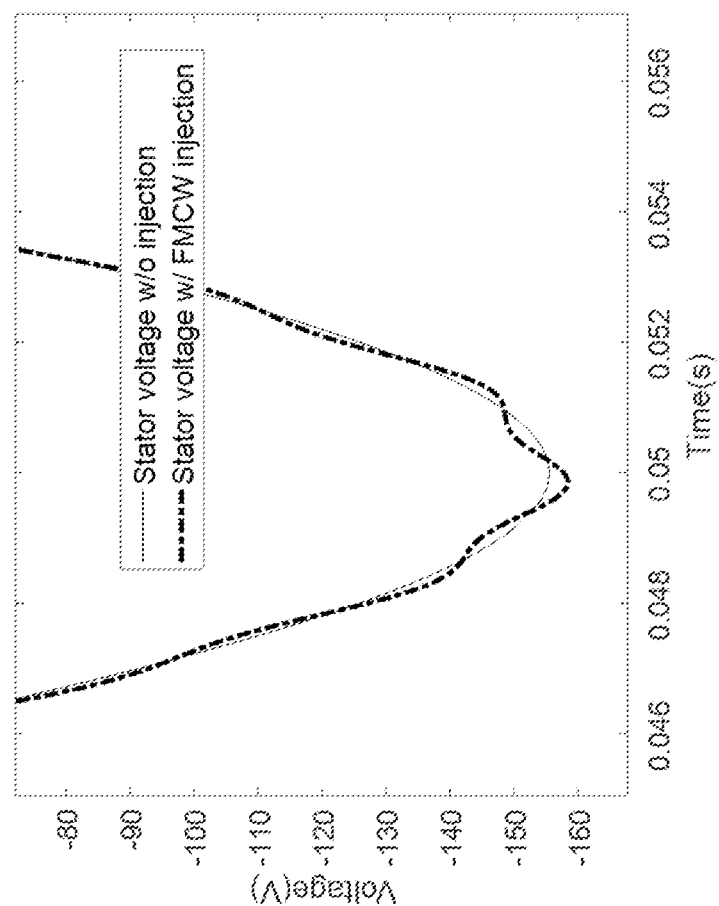

FIGS. 4A and 4B are exemplar plots of stator voltages $u_{a0}(t)$ in (20) without signal injection and $u_a(t)$ in (23) with FMCW signal injection powering the induction motor in a time and a zoomed-in view of the voltages, according to some embodiments of an invention. From FIG. 4B, we can see that when the FMCW signal is injected to the power source voltage, the power source waveform is slightly distorted. Since $U_i<<U_0$, the tiny distortion because of the injected signal will not influence the motor operation.

For phase $\varphi_a(t)$, we consider a frequency sweep period of T. The phase can be expressed as $$\varphi_{ia}(t) = 2\pi(u(t)f_1 + f_2)t', \quad (24)$$

where $$u(t) = 2\left[\frac{t}{T} - \left\lfloor\frac{t}{T}\right\rfloor\right] - 1, \quad (25)$$

is a saw-tooth signal of period T and of magnitude in the range of [−1,1]; $\lfloor \cdot \rfloor$ is the floor function that gives the greatest integer less than the input real number as output; and t' is the frequency sweep time, which is reset for each sweep duration as $$t' = t - \left\lfloor\frac{t}{T}\right\rfloor T = \frac{u(t)+1}{2}T, \quad (26)$$

such that $$\varphi_{ia}(t) = \varphi_{ia}(t+T). \quad (27)$$

The modulated frequency can be formulated as $$f_M(t) = \frac{1}{2\pi}\frac{\partial \varphi_a}{\partial t} = 2u(t)f_1 + f_1 + f_2 \quad (28)$$

$$\in [f_2 - f_1, f_2 + 3f_1] = [f_{min}, f_{max}]$$

When $f_1=0$, or equivalently $f_{min}=f_{max}=f_2$, the injected signal becomes a single frequency signal with frequency $f_2$, where $f_2>f_0$. FIGS. 3A and 3B are exemplar plots of current spectra with and without a single frequency signal injection powering the induction motor, according to some embodiments of an invention. However, this high-frequency signal injection method was found to be difficult for detecting broken-bar fault because the induced signal magnitude is too small to detect. In FIG. 3B, the fault signature magnitude is about 70 dB lower than the operating signal, which makes it very difficult to detect, especially under noisy environments.

To determine the frequency range of the injected FMCW signal, we first examine the induced signal of a single high frequency injection of $k^{th}$ harmonic. Given the motor speed n, motor slip is calculated as $$s = \frac{n_s - n}{n_s}.$$

If we treat the $k^{th}$ harmonic as the operating frequency, then the motor slip is $$s^k = \frac{n_s^k - n}{n_s^k} = \frac{kn_s - n}{kn_s} \tag{29}$$

If the $k^{th}$ harmonic amplitude is much larger than that of the fundamental frequency, the motor will accelerate to a much higher speed. Since the amplitude of the $k^{th}$ harmonic is not large enough to accelerate the motor speed, the motor is always operating in the starting process with a steady low speed.

As aforementioned, under broken-bar fault condition, fault frequency components $f_b = (1 \pm 2\kappa s)f_0$ will be induced in the stator current, in which the dominant one is $(1-2s)f_0$. The dominant fault characteristic frequency component induced by the injected $k^{th}$ harmonic in the motor current is $$(1 - 2s^k)f^k = \left(1 - 2\frac{ks_n - n}{kn_s}\right)kf_0 = (-k+2)f_0 - 2sf_0. \tag{30}$$

For k>>1, the absolute value of induced frequency is $2(1-s)f_0$ lower than the injected frequency. Note that this frequency shift $2(1-s)f_0$ between the injected signal and the induced signal is independent to the frequency of the injected signal. Although the magnitude of induced signal is very small and difficult to detect, we can make use of this property to detect fault. We inject a FMCW voltage signal with a band, the frequency band of induced signal will shift $2(1-s)f_0$ to a lower frequency band. We then compute the cross correlation between injected signal spectrum and the induced signal spectrum by integrating all frequency components, we expect a peak component can be detected at frequency shift $f=-2(1-s)f_0$.

To avoid interference between injected signal and induced signal, we adopt the frequency range $[kf_0, (k+2)f_0]$ as the injected FMCW signal frequency range. According to (24)-(28), the FMCW signal phase can be simplified as $$\varphi_a(t) = 2\pi\left(k + \frac{u(t)+1}{2}\right)f_0\frac{u(t)+1}{2}T. \tag{31}$$

Fault Signature Extraction

To demonstrate our proposed broken-bar fault detection method, we simulate the stator current under healthy and faulty conditions. We set $U_i=0.02U_0$ and T=3 s. The time-domain stator current of phase A in healthy condition can be expressed as $$i_a(t) = I_0 \cos(2\pi f_0 t + \varphi_0) + I_i\cos(\varphi_a(t)) = \tag{32}$$

$$I_0 \cos(2\pi f_0 t + \varphi_0) + I_i \cos\left(2\pi\left(k + \frac{u(t)+1}{2}\right)f_0\frac{u(t)+1}{2}T\right),$$

The time-domain stator current of phase A in faulty condition can be expressed as $$ki_{aF}(t) = \tag{33}$$

$$I_0 \cos(2\pi f_0 t + \varphi_0) + I_i\cos(\varphi_{af}(t)) + I_F\cos(\varphi_{af}(t) - 2\pi \times 2(1-s)f_0 t) =$$

$$I_0 \cos(2\pi f_0 t + \varphi_0) + I_i \cos\left[2\pi\left(k + \frac{u(t)+1}{2}\right)f_0\frac{u(t)+1}{2}T\right] +$$

$$I_F \cos\left[2\pi\left(k + \frac{u(t)+1}{2}\right)f_0\frac{u(t)+1}{2}T - 2\pi \times 2(1-s)f_0 t\right],$$

where the footscript '0' represents operating signal, footscript 'i' represents injected signal, and the footscript 'F' represents fault signal. In the frequency domain, we can write the stator current spectrum in healthy condition as $$I_a(\omega) = I_0(\omega)\delta(\omega - 2\pi f_0) + \Sigma_{f=kf_0, kf_0+\Delta f, \ldots, (k+2)f_0}I_i(\omega)\delta(\omega - 2\pi f), \tag{34}$$

where $\delta(\cdot)$ is the dirac delta function, $\Delta f$ is the frequency resolution related the to signal length in time, and $\Sigma_{f=kf_0, kf_0+\Delta f, \ldots, (k+2)f_0}I_i(\omega)\delta(\omega - 2\pi f)$ represents the injected signal frequency spectrum.

Correspondingly, in the frequency domain, we can write the stator current spectrum in faulty condition as $$I_{aF}(\omega) = I_0(\omega)\delta(\omega - 2\pi f_0)e^{-j\Phi_0} + \Sigma_{f=kf_0, kf_0+\Delta f, \ldots, (k+2)f_0}I_{i,f}$$
$$(\omega)\delta(\omega - 2\pi F)e^{-j\Phi_f} + \Sigma_{f=kf_0, kf_0+\Delta f, \ldots, (k+2)f_0}I_{F,f}(\omega)\delta$$
$$(\omega - 2\pi f - 2\pi \times 2(1-s)f_0 t)e^{-j\Phi_f} \tag{35}$$

where $\Sigma_{f=kf_0, kf_0+\Delta f, \ldots, (k+2)f_0}I_{F,f}(\omega)\delta(\omega - 2\pi f - 2\pi \times 2(1-s)f_0 t)$ $e^{-j\Phi_f}$ represents the frequency spectrum of fault signal induced by the injected signal and $I_{F,f}$ is the magnitude of fault signal at frequency f in the frequency domain.

Typically $I_{F,f} \ll I_{i,f}$ and $I_{F,f} \ll I_0$, meaning the induced fault signal magnitude is much smaller than the injected signal magnitude and the operating signal magnitude.

Figure 5A:
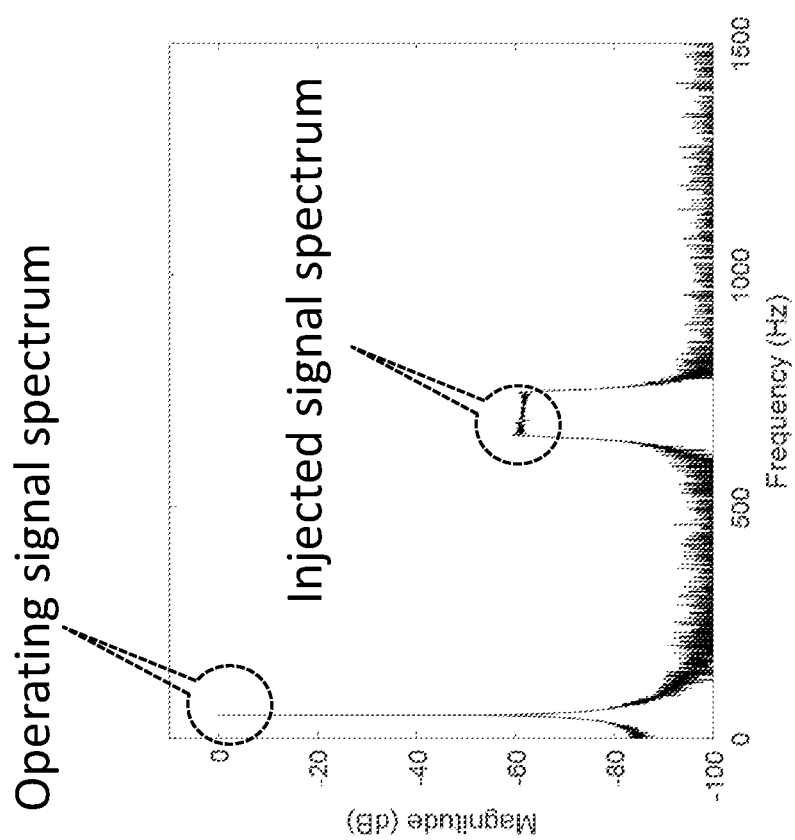
FIGS. 5A and 5B are exemplar plots of stator current spectra with FMCW injection under healthy and faulty conditions respectively, according to embodiments of an invention.
Figure 5B:
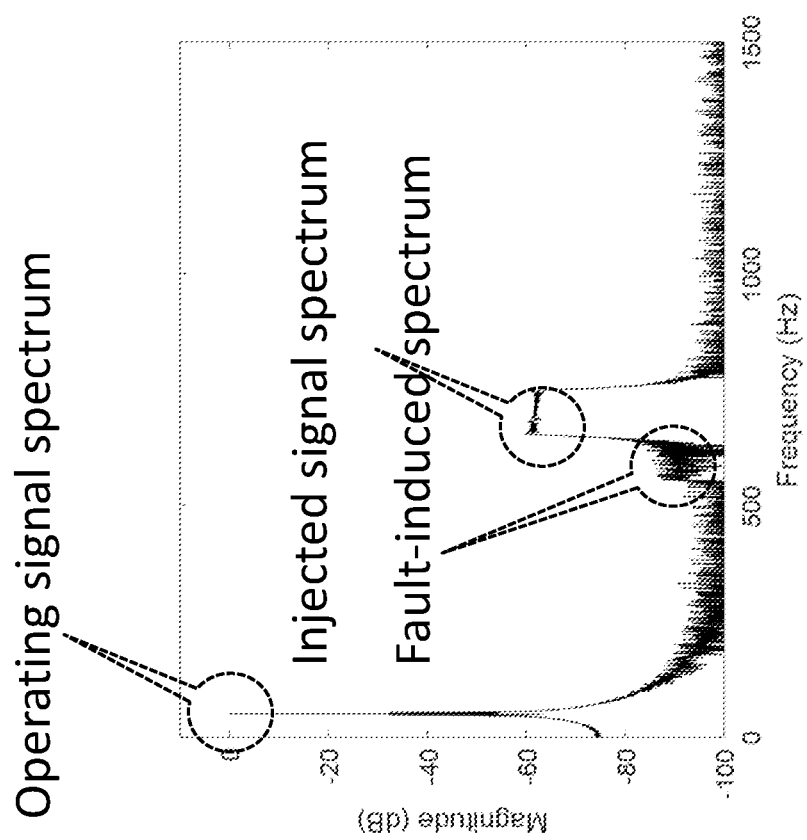

FIGS. 5A and 5B are exemplar plots of stator current spectrum with FMCW injection under healthy and faulty conditions respectively, with injected signal frequency band 650 Hz~750 Hz, or k=$13^{th}$~$15^{th}$ harmonics, according to some embodiments of the invention. It is clear that the induced fault signal magnitude from 550 Hz~650 Hz is more than 20 dB lower than the injected signal magnitude, and more than 80 dB lower than the operating signal magnitude at 50 Hz. The small fault signal magnitude makes it difficult to detect, especially under noisy measurements.

To improve the detection performance, we analyze the spectrum correlation in the frequency domain. We compute the cross correlation between the injected signal and the induced signal spectrum as $$R_{U_{ia}(\omega), I_{af}(\omega)}(\omega_d) = \sum_{\omega} U_{ia}(\omega + \omega_d)I_{af}^*(\omega) \propto \tag{35}$$

-continued $$\left[\sum_{f=kf_0, kf_0+\Delta f,\ldots,(k+2)f_0,} I_{i,f}(\omega)\delta(\omega+\omega_d-2\pi f)e^{-j\phi_f}\right].$$

$$[I_0(\omega)\delta(\omega-2\pi f_0)e^{-j\phi_0} + \Sigma_{f=kf_0,kf_0+\Delta f,\ldots,(k+2)f_0,}I_{i,f}(\omega)\delta(\omega-2\pi f)e^{-j\phi_f} + s)f_0 t)e^{-j\phi'_f}]^*$$

Figure 5C:
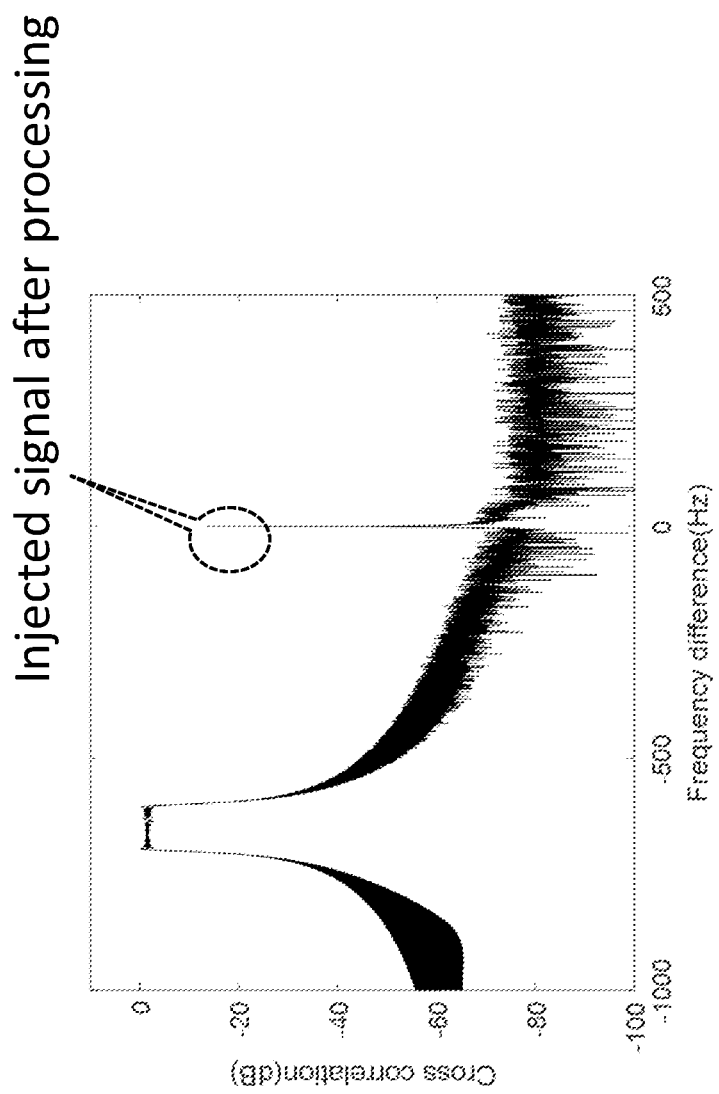
FIGS. 5C and 5D are exemplar plots of processed spectra using cross correlation analysis for fault signature extraction under healthy and faulty conditions respectively, according to embodiments of an invention.
Figure 5D:
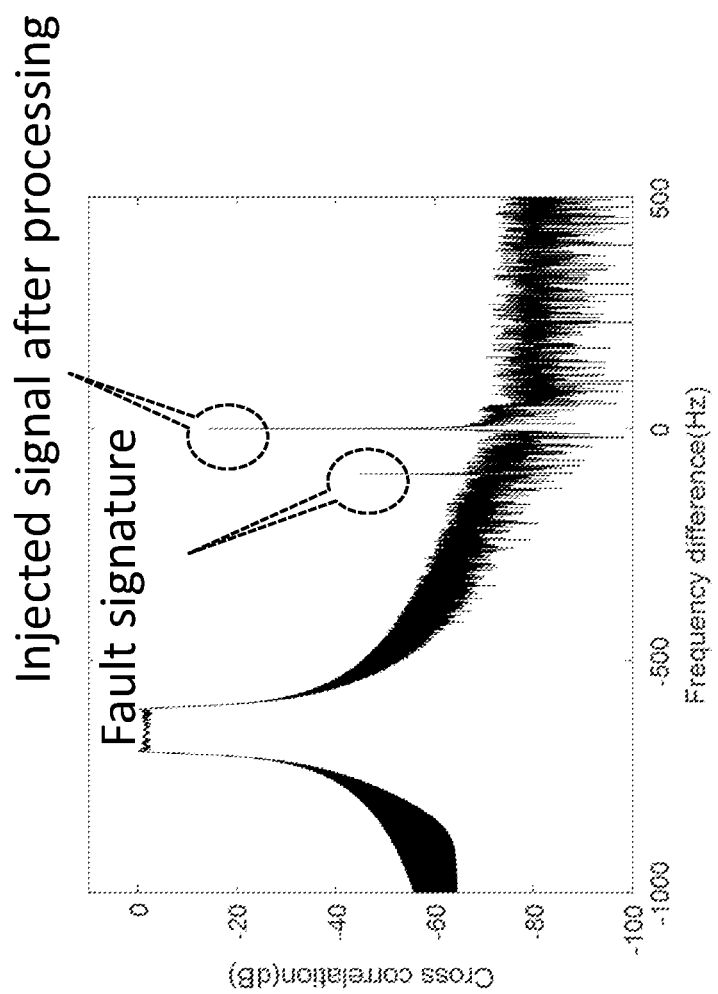

FIGS. 5C and 5D are exemplar plots of processed current spectrum using cross correlation analysis for fault signature extraction under healthy and faulty conditions respectively, according to some embodiments of the invention. Fault signature is then extracted based on the cross correlation function $R_{U_{ia}(\omega),I_a(\omega)}(\omega_d)$. We observe that the fault signature magnitude at frequency shift $f=-2(1-s)f_0$ is about 40 dB lower than the maximum cross correlation value, with more than 30 dB improvement compared to that of single frequency signal injection. Therefore, with FMCW signal injection, we can extract the fault signature effectively. Alternatively, when we extract fault signature in cross correlation function $R_{U_{ia}(\omega),I_a(\omega)}(\omega_d)=-R_{I_a(\omega),U_{ia}(\omega)}(\omega_d)$, the fault signature frequency will be $f=2(1-s)f_0$.

Figure 6:
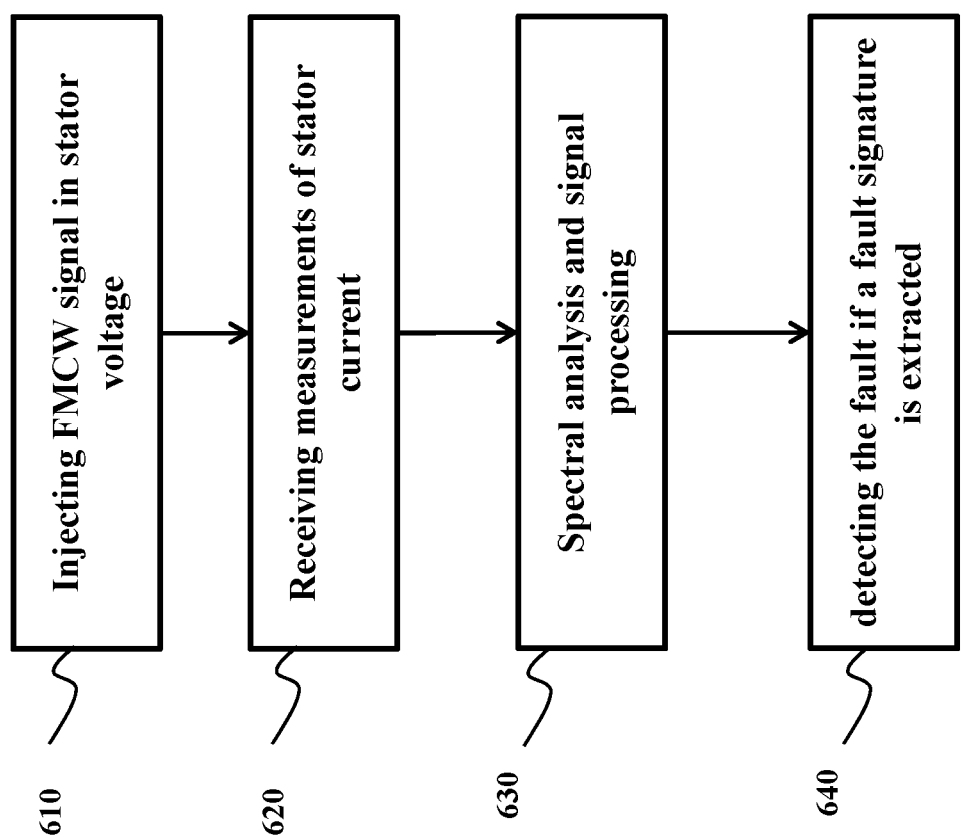
FIG. 6 is a block diagram of a method for detecting the faults in the induction motor according to one embodiment of the invention.

FIG. 6 shows a block diagram illustrating the steps of a computer-implemented fault signal measuring method for automatically detecting broken bar faults during operations of an induction motor powered by a stator voltage. The computer-implemented fault signal measuring method includes at least steps of injecting FMCW signal in stator voltage in 610, receiving measurements of stator current in 620, spectral analysis and signal processing in 630, and determining the fault if a fault signature is extracted in 640.

First, the FMCW signal (FIGS. 4A and 4B) is injected to the stator voltage to power the squirrel-cage induction motor in step 610. During operation, the stator current is measured, as shown in equations (32) and (33). The method then analyzes the frequency spectrum of stator current in step 630, as shown in FIG. 5A and FIG. 5B for healthy motor and faulty motor respectively. The cross correlation between the stator current spectrum and the injected signal spectrum is computed according to equation (35), with results shown in FIG. 5C and FIG. 5D for healthy motor and faulty motor respectively. The fault signature at frequency $f=\pm2(1-s)f_0$ in the cross-correlation function is extracted for further evaluation.

Figure 7:
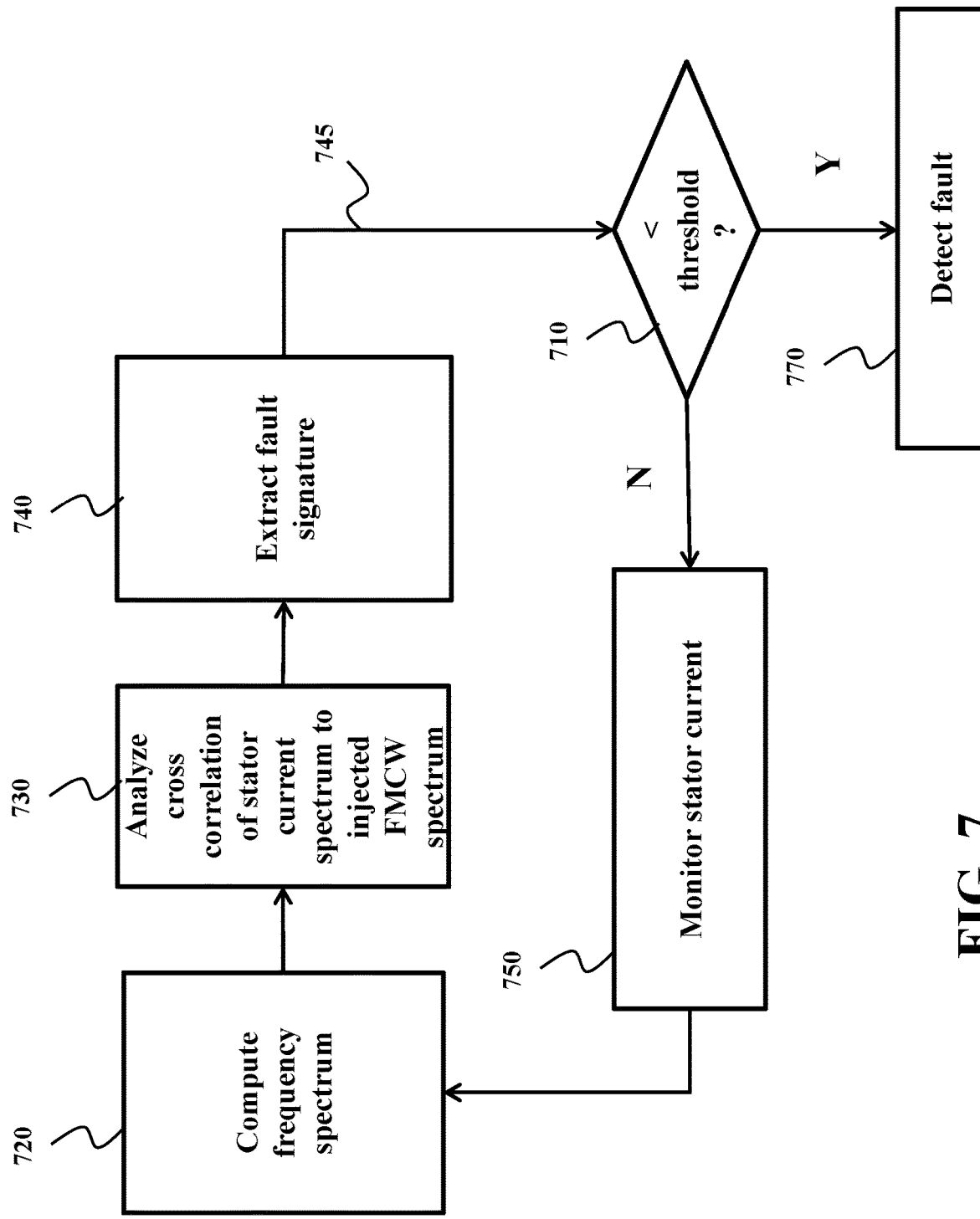
FIG. 7 is a block diagram of a method for automatically detecting the faults in the induction motor according to another embodiment of the invention.

FIG. 7 is a block diagram illustrating the process steps of a computer-implemented fault signal measuring method (fault detection program 230) for automatically detecting the faults in the induction motor according to another embodiment of the invention.

With injected FMCW signal in the power voltage, we monitor the stator current, as shown in equations (32) and (33). The frequency spectra of the stator current (FIG. 5A and FIG. 5B for healthy motor and fault motor, respectively) and the injected signal are analyzed in step 730. The cross correlation between the injected signal spectrum and the stator current spectrum is computed in step 720, as shown in FIG. 5C and FIG. 5D for healthy motor and faulty motor, respectively. The method then extracts fault signature at frequency $f=\pm2(1-s)f_0$ in the cross-correlation function in step 740. If the fault signature magnitude is greater than a threshold in step 710, a broken-bar fault is detected in step 770. In other words, the system determines that the broken-bar fault takes place. Otherwise, the system keeps monitoring stator current for analysis in step 750. In some cases, the threshold can be defined around −50 dB compared to the maximum cross correlation value.

The above-described embodiments of the present invention can be implemented in any of numerous ways. For example, the embodiments can be implemented using hardware, software or a combination thereof. When implemented in software, the software code can be executed on any suitable processor or collection of processors, whether provided in a single computer or distributed among multiple computers, for example, in a computer cloud. Such processors can be implemented as integrated circuits, with one or more processors in an integrated circuit component. Though, a processor can be implemented using circuitry in any suitable format.

Further, it should be appreciated that a computer can be embodied in any of a number of forms, such as a rack-mounted computer, a desktop computer, a laptop computer, minicomputer, or a tablet computer. Such computers can be interconnected by one or more networks in any suitable form, including as a local area network or a wide area network, such as an enterprise network or the Internet. Such networks can be based on any suitable technology and can operate according to any suitable protocol and can include, for example, wireless networks, wired networks or fiber optic networks.

Also, the embodiments of the invention can be embodied as a method, of which an example has been provided. The steps performed as part of the method can be ordered in any suitable way. Accordingly, embodiments can be constructed in which acts are performed in an order different than illustrated, which can include performing some acts simultaneously, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A computer-implemented fault signal measuring method for detecting broken bar faults during operations of an induction motor powered by a stator voltage, wherein the method uses a processor coupled with a memory storing instructions implementing the method, wherein the instructions, when executed by the processor, carry out at steps of the method, comprising:
   injecting frequency modulated continuous wave (FMCW) signals to the induction motor being operated via an interface, wherein the FMCW signals are modulated such that the FMCW signals are superimposed on a fundamental frequency of the stator voltage;
   acquiring, via the interface, a response current signal for a frequency sweep period, wherein the induction motor generates the response current signal in response to the injected FMCW signals;
   performing spectrum analysis of the injected FMCW signals and the response current signal of the induction motor;

computing cross correlation between a stator current frequency spectrum of the induction motor and a frequency spectrum of the injected FMCW signals;

extracting fault signature of broken bar fault from a result of the computed cross-correlation; and determining that a broken bar fault takes place in the induction motor if a magnitude of the fault signature is greater than a threshold.

2. The method of claim 1, wherein the FMCW signals are modulation frequency continuous sinusoidal signals.

3. The method of claim 1, wherein a frequency range of the FMCW signals are configured to be greater than an operating frequency of the induction motor.

4. The method of claim 1, wherein the induction motor is a squirrel-cage induction motor.

5. The method of claim 1, further comprising:

interrupting supplying the stator voltage when the determining indicates that the broken bar fault takes place.

6. The method of claim 1, wherein the acquiring is performed at a sampling rate of at least twice of a highest frequency of the injected FMCW signals, wherein the acquiring is performed on a uniform grid to produce a set of samples for a grid of frequencies.

7. The method of claim 1, wherein the broken bar fault is modeled by an open circuit of a corresponding branch of an equivalent circuit of rotor in the induction motor.

8. The method of claim 7, wherein the equivalent circuit of the rotor represents n rotor bars, wherein the rotor is modeled as n+1 independent current loops, where n independent current loops of the n+1 independent current loops are identical circuit loops under ideal condition, with each identical circuit loop of the identical circuit loops comprising two adjacent rotor bars connected by two end ring portions of a plurality of end rings, and wherein a remaining independent current loop of the n+1 independent current loops is formed by a first end ring of the plurality of end rings, such that a current distribution in the rotor is specified in terms of (n+1) independent loop currents, wherein the current distribution in the rotor comprises n rotor-bar loop currents $i_j$ ($1 \le j \le n$) and an end ring loop current $i_e$ of the first end ring of the plurality of end rings.

9. The method of claim 1, wherein the threshold is defined to be $-50$ decibels (db) compared to a maximum cross correlation value.

10. The method of claim 1, wherein in the extracting step, a frequency f of the fault signature is at $f=\pm 2(1-s)f_0$, where s is speed slip for the induction motor and $f_0$ is frequency of power supply to the induction motor.

11. A fault-detection apparatus for detecting broken bar faults during operations of an induction motor powered by a stator voltage, comprising:

an interface connected to a frequency modulated continuous wave (FMCW) generator and configured to cause a controller of the induction motor to add FMCW signals to the stator voltage via the FMCW generator;

a memory configured to store instructions of a computer-implemented fault signal measuring method for detecting broken bar faults during operations of an induction motor powered by a stator voltage; and a processor coupled with the memory, wherein the processor is configured to execute the instructions implementing the method, wherein the method comprises:

injecting, via the interface, the FMCW signals to the stator voltage of the induction motor, wherein the FMCW signals are modulated such that the FMCW signals are superimposed on a fundamental frequency of the stator voltage;

acquiring, via the interface, a response current signal for a frequency sweep period, wherein the induction motor generates the response current signal in response to the injected FMCW signals;

performing spectrum analysis of the injected FMCW signals and the response current signal of the induction motor;

computing cross correlation between a stator current spectrum of the induction motor and a current spectrum of the injected FMCW signals;

extracting fault signature of broken bar fault from a result of the computed cross-correlation; and determining that a broken bar fault takes place in the induction motor if a magnitude of the fault signature is greater than a threshold.

12. The fault-detection apparatus of claim 11, wherein the FMCW signals are modulation frequency continuous sinusoidal signals.

13. The fault-detection apparatus of claim 11, wherein a frequency range of the FMCW signals are configured to be greater than an operating frequency of the induction motor.

14. The fault-detection apparatus of claim 11, wherein the induction motor is a squirrel-cage induction motor.

15. The fault-detection apparatus of claim 11, further comprising:

interrupting supplying the stator voltage when the determining indicates that the broken bar fault takes place.

16. The fault-detection apparatus of claim 11, wherein the acquiring is performed at a sampling rate of at least twice of a highest frequency of the injected FMCW signals, wherein the acquiring is performed on a uniform grid to produce a set of samples for a grid of frequencies.

17. The fault-detection apparatus of claim 11, wherein the broken bar fault is modeled by an open circuit of a corresponding branch of an equivalent circuit of rotor in the induction motor.

18. The fault-detection apparatus of claim 17, wherein the equivalent circuit of the rotor represents n rotor bars, wherein the rotor is modeled as n+1 independent current loops, where n independent current loops of the n+1 independent current loops are identical circuit loops under ideal condition, with each identical circuit loop of the identical circuit loops comprising of two adjacent rotor bars connected by two end ring portions of a plurality of end rings, and wherein a remaining independent current loop of the n+1 independent current loops is formed by a first end ring of the plurality of end rings, such that a current distribution in the rotor is specified in terms of (n+1) independent loop currents, wherein the current distribution in the rotor comprises n rotor-bar loop currents $i_j$ ($1 \le j \le n$) and an end ring loop current $i_e$ of the first end ring of the plurality of end rings.

19. The fault-detection apparatus of claim 11, wherein the threshold is defined to be $-50$ decibels (db) compared to a maximum cross correlation value.

20. The fault-detection apparatus of claim 11, wherein in the extracting step, a frequency f of the fault signature is at $f=\pm 2(1-s)f_0$, where s is speed slip for the induction motor and $f_0$ is frequency of power supply to the induction motor.

* * * * *